United States Patent [19]
Kitai et al.

[11] 3,987,464
[45] Oct. 19, 1976

[54] ELECTRONIC SHUTTER CONTROL CIRCUIT HAVING EXPOSURE TIME INDICATOR

[75] Inventors: Kiyoshi Kitai; Yuzuru Takazawa, both of Tokyo, Japan

[73] Assignee: Seiko Koki Kabushiki Kaisha, Japan

[22] Filed: Dec. 23, 1974

[21] Appl. No.: 535,211

[30] Foreign Application Priority Data
Dec. 27, 1973  Japan.................................. 49-551

[52] U.S. Cl. ............................... 354/51; 354/60 L; 354/127
[51] Int. Cl.² ..................... G03B 7/08; G03B 17/18
[58] Field of Search .................. 354/51, 50, 48, 53, 354/60 L, 127

[56] References Cited
UNITED STATES PATENTS

| | | | |
|---|---|---|---|
| 3,504,604 | 4/1970 | Kitai .................... | 354/51 |
| 3,672,267 | 6/1972 | Harvey et al. ................. | 354/60 L X |
| 3,678,821 | 7/1972 | Kitai ..................... | 354/51 |
| 3,698,299 | 10/1972 | Arisaka et al. ................ | 354/60 L X |
| 3,712,194 | 1/1973 | Yoshimura .................... | 354/60 L X |
| 3,765,311 | 10/1973 | Nobusawa............................. | 354/51 |
| 3,800,683 | 4/1974 | Nobusawa............................. | 354/51 |
| 3,821,756 | 6/1974 | Kitai ................. | 354/51 X |
| 3,846,814 | 11/1974 | Yata et al. ........................ | 354/51 X |
| 3,868,705 | 2/1975 | Katai..................... | 354/51 |

FOREIGN PATENTS OR APPLICATIONS
1,259,696  1/1968  Germany .............................. 354/50

*Primary Examiner*—Joseph F. Peters Jr.
*Attorney, Agent, or Firm*—Robert E. Burns; Emmanuel J. Lobato; Bruce L. Adams

[57] ABSTRACT

An electronic camera shutter control circuit having an indicator for indicating when the camera shutter is open. A circuit responsive to a control signal controls a current flow through an electromagnet which is energized during the opening of the camera shutter to prevent the shutter release mechanism from closing the shutters. An indicating element indicates that current is flowing through the electromagnet and therefore indicates that the shutter is open. A control circuit having a photoresponsive element develops a control signal determined by the brightness of the scene to be photograhed and applies the control signal to the circuit responsive to the control signal. The control circuit includes a capacitor which is charged at a rate determined by the conductivity of the photoresponsive element which varies according to the light sensed. When the voltage stored in the capacitor exceeds a predetermined value, the circiut responsive to the control signal deenergizes the electromagnet so that the camera shutter closes. The circuit responsive to the control signal comprises a pair of transistors with their respective emitters connected to the indicator.

5 Claims, 2 Drawing Figures

ELECTRONIC SHUTTER CONTROL CIRCUIT HAVING EXPOSURE TIME INDICATOR

BACKGROUND OF THE INVENTION

The present invention relates to electronic camera shutter control circuits and more particularly to a new and improved electronic camera shutter control circuit having an indicator for indicating when the camera shutter is open.

Electronic camera shutter control circuits of various types are known. In one type of known control circuit an output transistor is alternatively connected to an electronic display device or an electromagnet through a change-over switch. This structure enables the control circuit for both an indicating function for indicating the brightness of the scene to be photographed and for controlling the exposure time by controlling the energization of the electromagnet. However, the reliability of this circuit is dependent upon the reliability of the change-over switch and it is difficult and expensive to realize a highly reliable change-over switch within the small space of a camera shutter.

In another of the known types of shutter control circuits a lamp or other indicating device is connected in parallel with an electromagnet energized under control of the control circuit. Consequently, when the electromagnet is energized the lamp will also be energized and indicate that the camera shutter is open. In this way, the control circuit may also be used for detecting the brightness of the scene to be photographed before exposure of the film. However, the parallel arrangement of the lamp and electromagnet results in high operating currents and hence short battery life.

SUMMARY OF THE INVENTION

It is a primary object of the invention to provide an electronic camera shutter control circuit having an indicator for indicating the opening of the shutter.

Another object is to provide an electronic shutter control circuit having low power consumption during operation.

An electronic shutter control circuit according to the invention comprises control circuit means responsive to external light for developing a control signal having a rate of increase determined by the intensity of the external light. The control signal is applied to circuit means responsive to the control signal for electrically connecting an electromagnet and an indicating element in series with an external bias voltage. The control circuit means includes a photoresponsive element in series with a capacitor. The rate of charge of the capacitor is controlled by the resistance of the photoresponsive element. The resistance of the photoresponsive element is in turn controlled by the intensity of light incident on the photoresponsive element. The circuit responsive to the control signal comprises a pair of transistors each having a corresponding one of their conduction electrodes connected together. The voltage developed across the capacitor is applied to a control electrode of a first of the transistors and biases it from a non-conductive or cutoff to a conductive condition. When the first transistor is biased to conduct, its output is applied to the second transistor to bias the second transistor into the cutoff condition. The electromagnet and the indicating device are energized by the current flowing through the second transistor so that the electromagnet is energized when the first transistor is conductive.

BRIEF DESCRIPTION OF THE DRAWINGS

Other features and advantages of the electronic shutter control circuit according to the invention will be apparent from the disclosure and appended claims and drawings in which corresponding elements have the same reference characters and in which:

DESCRIPTION OF THE PREFERRED EMBODIMENTS

Figure 1:
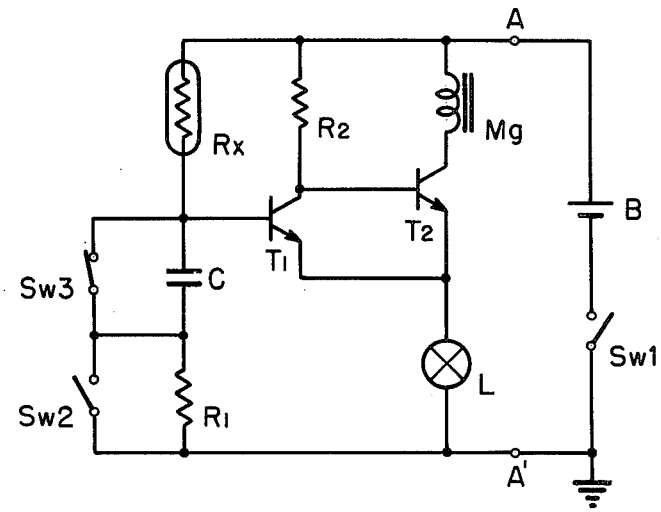
FIG. 1 is a circuit diagram of an electronic shutter control circuit according to the present invention.

The electronic shutter control circuit according to the invention and illustrated in the drawings comprises a pair of transistors T1 and T2 which together jointly define a Schmitt trigger circuit including input stage comprised of transistor T1 and output stage comprised of transistor T2. The emitter of each of the transistors T1 and T2 are connected together and the collector of the transistor of T1 is connected to the base of the transistor T2 so that the conductive state of transistor T2 is determined by the output of transistor T1. The electromagnet M2 is connected to the collector of the transistor T2 and the lamp L is connected to the common emitters of the transistors T1 and T2. The base of the transistor T1 is connected to the junction of the photoresponsive element Rx and capacitor C which are part of a series combination of the photoconductive element Rx, capacitor C and resistor R1. A bias voltage is developed in operation at the control circuit power terminals A, A' by a battery B. The position of the switches shown in FIG. 1 are the positions before the control circuit is placed in operation. That is, switch Sw1 in series with the battery B is normally open, switch Sw2 in parallel with the transistor R1 is normally open and switch Sw3 in parallel with the capacitor C is normally closed.

The control circuit is placed in operation by the actuation of the camera shutter release button (not shown). As the shutter release button is initially depressed the switch Sw1 is closed to apply the bias voltage developed by battery B to the circuit. If the value of the bias voltage is VB, the value of the voltage applied to the base of transistor T1 is approximately equal to VB divided by the ratio of the resistance of the photoresponsive element Rx to the value of the resistance of the resistor R1. If light from the scene to be photographed illuminates the photoresponsive element Rx, then the voltage applied to the base of transistor T1 will be representative of the brightness of the scene to be photographed. Therefore, this voltage can be used to control the duration of the shutter opening, and hence the duration of the film exposure.

If the photoresponsive element Rx is illuminated by low-level light, corresponding to a dimly illuminated scene to be photographed, the value of the resistance of the photoresponsive element Rx will be high and the ratio of the value of the resistance of the photoresponsive element Rx to the value of the resistance of the resistor R1 will be high. Therefore, most of the voltage drop of the bias voltage VB will be across the photoresponsive element Rx and the voltage applied to the base of the transistor T1 will be low. If the voltage applied to the base of the transistor T1 is less than a certain threshold voltage VT, the transistor T1 will be cutoff and the transistor T2 will be conductive. When the transistor T2 is conductive, current flows through and energizes the electromagnet Mg. Additionally, current will flow through the lamp L to light it and thereby indicate that the level of illumination of the scene to be photographed is low.

Conversely, when the scene to be photographed is highly illuminated and light from the scene to be photographed is incident on the photoresponsive element Rx, then the resistance of the photoresponsive element Rx will be low. Under these conditions the voltage drop developed across the resistor R1 will be higher than when the photoresponsive element Rx is dimly illuminated so that the voltage applied to the base of the transistor T1 will be above the threshold voltage VT and the transistor T1 will be biased to conduct. When the transistor T1 is conductive the voltage developed at the collector of the transistor T1 biases the transistor T2 into cutoff so that no current will flow through the electromagnet Mg and it will be deenergized. However, current will flow through the circuit path defined by the current limiting resistor R2, the transistor T1 and the lamp L. If the value of the resistor R2 is sufficiently large, the current flowing through the lamp L will be too low to cause the lamp to glow. This will indicate that the scene to be photographed is brightly illuminated. In practice, a value of the resistance of the resistor R2 on the order of 100 times the D.C. resistance of the electromagnet Mg has been found satisfactory.

As the release button is further depressed the switch Sw2 is closed so the base of the transistor T1 is grounded through the series combination of the closed switch Sw2 and the closed switch Sw3 and the transistor T1 is cutoff. As described hereinabove, when the transistor T1 is cutoff the transistor T2 is conductive, the electromagnet Mg is energized and the lamp L glows. As the release button is depressed still further, the camera shutter blade opening member (not shown) is actuated and the camera shutter blades start opening to initiate the exposure of the film. At the same time, the timing switch Sw3 is opened so that current flow through the photoresponsive element Rx charges the capacitor C.

The rate of charging of the capacitor C is dependent on the value of the resistance of the photoresponsive element Rx, and therefore the rate is dependent on the brightness of the scene to be photographed. When the value of the voltage stored in the capacitor C exceeds the threshold voltage VT the transistor T1 will conduct and bias the transistor T2 into cutoff. The brighter the scene to be photographed, the lower the resistance the photoresponsive element Rx will be and hence the greater the current flow therethrough. A high current corresponds to a short charging time so that the exposure time of a bright scene will be less than the exposure time of a dimly illuminated scene.

When the transistor T2 is cutoff the current flowing through the electromagnetic Mg is interrupted, the electromagnet Mg is deenergized, and the lamp L will no longer glow. When the electromagnet Mg is deenergized, the camera shutter blade closing member (not shown) is released to effect closure of the camera shutter blades and terminate the exposure. Since the lamp L is always illuminated when the electromagnet Mg is energized, the lamp L serves as an indicator to indicate that an exposure of the film is in progress or has been completed.

Figure 2:
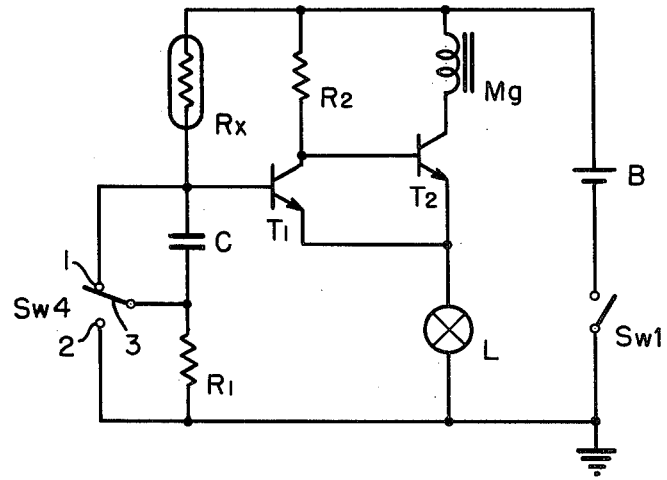
FIG. 2 is another embodiment of the control circuit according to the present invention.

In the embodiment of the invention shown in FIG. 2 the previously described switches Sw2 and Sw3 have been replaced by a single pole double throw switch Sw4. This switch comprises a pair of stationary contacts 1 and 2 and a movable contact 3 which may be alternatively positioned to contact either of the stationary contacts. The stationary contact 1 is connected to the junction of the photoresponsive elements Rx and the capacitor C, the stationary contact 2 is connected to the ground side of the resistor R1 and the movable contact 3 is connected to the capacitor C and the resistor R1.

In operation, switch Sw4 is actuated by the camera shutter release button (not shown) in a manner similar to the actuation of the switches Sw2 and Sw3 by the release button described hereinabove. The movable contact 3 switch Sw4 is normally positioned as shown in FIG. 2. As the release button is depressed the switch Sw1 is closed and the circuit will be operative to sense the intensity of light incident on the photoresponsive element Rx. As the release button is further depressed, opening of the shutter is initiated and the movable contact 3 is positioned by the camera shutter blade opening member (not shown) to contact the stationary contact 2 at the same time opening of the shutter blades begins. The subsequent operation of the circuit is the same as that described for the embodiment shown in FIG. 1. In practice, the use of switch Sw4 has certain advantages arising from the fact that the switch Sw4 is actuated directly by the camera shutter blade opening member.

The preferred embodiments of the invention described hereinabove include a lamp L as a visual indicating element. Other indicating elements may also be used with the present invention including light emitting diodes, audible alarms, or relays for switching other circuits. The particular structure of the indicating element is not an essential feature of the present invention, but rather the placement of the indicating element within the control circuit to eliminate switches for switching the indicating element in and out of the control circuit and to reduce the current consumption is an essential feature of the invention.

What I claim and desire to secure by Letters Patent:

1. A control circuit for a camera shutter, comprising: a Schmitt trigger circuit including an input stage comprised of a first transistor and an output stage comprised of a second transistor having an emitter and a collector; means for applying a brightness signal having a magnitude proportional to a brightness of a scene to be photographed to said first transistor and for applying an exposure time signal having a duration determined by the brightness of a scene to be photographed to said first transistor, said brightness signal having a magnitude less than a certain threshold value when the brightness of the scene to be photographed is less than a certain value to render said first transistor non-conductive and thereby render said second transistor conductive, and said exposure time signal having a magnitude less than said certain threshold value for a period of time equal to an exposure time determined by the brightness of the scene to be photographed thereby to render said second transistor conductive during said exposure time; an electromagnet connected to the output stage of said Schmitt trigger circuit and energized when said second transistor is rendered conductive, whereby said electromagnet is deenergized upon completion of said exposure time; and an indicating device connected to said emitter of said second transistor to define an emitter impedance of said Schmitt trigger circuit output stage and energized to indicate when said second transistor is conductive, whereby said indicating device indicates when the brightness of the scene to be photographed is less than said certain value during the occurrence of said brightness signal, and indicates when said electromagnet is energized during said exposure time signal.

2. A control circuit according to claim 1, wherein said means for applying comprises: a photoconductive element receptive in use of light from the scene to be photographed; and a capacitor connected in series with said photoconductive element to define an RC circuit, said RC circuit biased in use to develop said brightness signal and said exposure time signal.

3. A control circuit according to claim 2, wherein said means for applying further comprises: a resistor connected in series with said capacitor; and means for selectively short-circuiting said capacitor to develop said brightness signal or for short-circuiting said resistor to develop said exposure time signal.

4. A control circuit according to claim 3, wherein said means for selectively short-circuiting comprises: a first switch connected in parallel with said capacitor; and a second switch connected in parallel with said resistor.

5. A control circuit according to claim 3, wherein said means for selectively short-circuiting comprises: a switch having a first and a second stationary contact, and a movable contact positionable to selectively conductively contact said first or said second stationary contact, said movable contact connected to said capacitor and said resistor, and said first and second stationary contacts connected respectively to said capacitor and said resistor, whereby said movable contact is selectively positionable to short-circuit said capacitor or short-circuit said resistor.

* * * * *